UNITED STATES PATENT OFFICE.

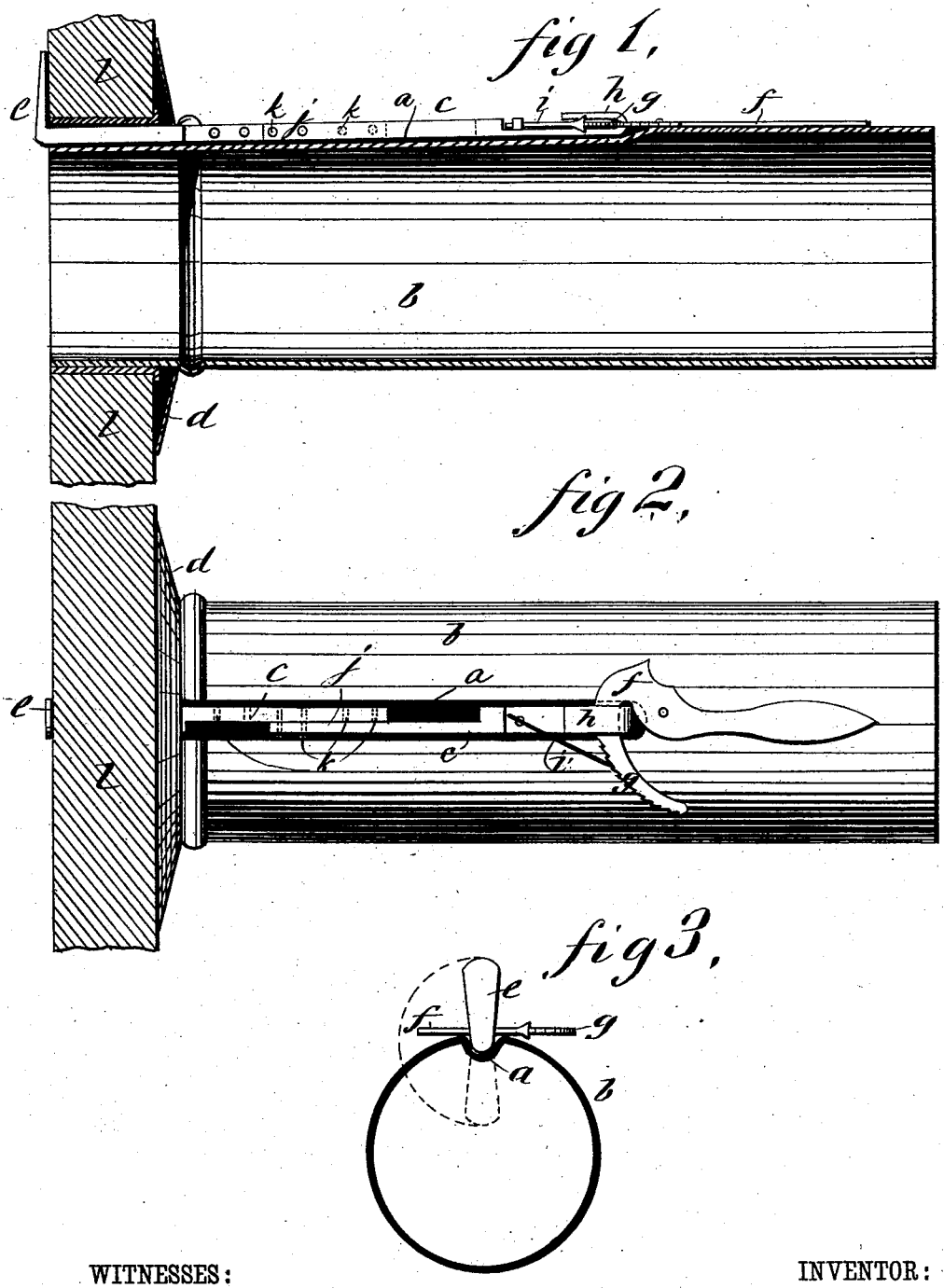

AMBROSE HUTTINGER, OF LIVERPOOL, OHIO.

STOVE-PIPE FASTENER.

SPECIFICATION forming part of Letters Patent No. 275,660, dated April 10, 1883.

Application filed February 13, 1883. (Model.)

*To all whom it may concern:*

Be it known that I, AMBROSE HUTTINGER, of Liverpool, in the county of Medina and State of Ohio, have invented a new and Improved Stove-Pipe Fastener, of which the following is a full, clear, and exact description.

My invention consists of a hook-lever pivoted on the side of the pipe to be fastened near the end, and a rod extending therefrom along a groove in the side of the pipe and through the pipe-hole, and having an elbow or hook to engage with the stove-cover, chimney, wall, or other place with which the pipe is to connect, to be strained up by the hook and held thereby, the hook being provided with a toothed rack and a spring-pawl for holding it, and the rod being extensible for connecting with a thin stove-plate or a thick chimney-wall, all as hereinafter fully described.

Reference is to be had to the accompanying drawings, forming part of this specification, in which similar letters of reference indicate corresponding parts in all the figures.

Figure 1 is a sectional elevation of a section of stove-pipe fitted in and secured to the chimney-wall by my improved device. Fig. 2 is a side elevation of the same, and Fig. 3 is an end view of the pipe.

I make a groove, $a$, along the pipe $b$, a suitable distance from the end, by creasing and indenting it suitably for placing a small rod, $c$, therein, so that when the pipe is inserted in the stove or chimney hole the rod will extend through the hole and also through the collar $d$ (when it is used) to hook under or behind the plate or wall $l$ by its elbow $e$. At the upper end of the groove I pivot a lever-hook, $f$, having an eccentric arm, $g$, to draw the rod taut by sliding through the hook $h$ of the upper end of the rod, or any equivalent of the hook. The arm $g$ is also toothed on its convex side to form a rack for being fastened by a spring-pawl, $i$, connected to the rod. The rod is made in two parts, which are connected by a lap-joint, $j$, fastened by bolts $k$, and being extensible by taking out the bolts and shifting the parts along from hole to hole.

It will be seen that by a simple contrivance of this kind the pipe may be effectually fastened, so as not to draw out nor slide in, and that it will not sag where it connects with the chimney. For inserting the pipe and the rod together in the stove or chimney hole, the elbow $e$ will be turned inward, as indicated by the dotted lines in Fig. 3, to be turned out in the position for engaging the plate or wall afterward.

Having thus described my invention, I claim as new and desire to secure by Letters Patent—

1. A stove-pipe fastener consisting of the lever-hook $f$, pivoted to the side of the pipe, and the rod $c$, arranged in a groove in the pipe, and having an elbow, $e$, the said hook and rod being connected and having a ratchet and spring pawl, substantially as described.

2. The combination of an extensible rod, $c$, having elbow $e$, spring $i$, and hook or equivalent device $h$ with the hook-lever $f$, having eccentric and notched arm $g$, and being arranged with a pipe having a groove or crease, $a$, substantially as described.

AMBROSE HUTTINGER.

Witnesses:
JASON MATHERS,
FRANK G. HOEFFLER.